April 19, 1960

J. S. CAMPBELL 2,933,103

HIGH PRESSURE BALL RELIEF VALVE

Filed March 26, 1959

INVENTOR.
James S. Campbell
BY
Harness & Harris
ATTORNEYS.

2,933,103
Patented Apr. 19, 1960

2,933,103
HIGH PRESSURE BALL RELIEF VALVE

James S. Campbell, Highland Park, Mich., assignor to Chrysler Corporation, Highland Park, Mich., a corporation of Delaware Application March 26, 1959, Serial No. 802,237

9 Claims. (Cl. 137—539.5)

This invention relates to ball relief valves and in particular to a valve adapted for use in high pressure fluid systems, as for example in the bypass circuit of an automobile power steering pump wherein a comparatively large volume of high pressure fluid must flow on occasion through the relief valve with a minimum of valve noise.

An object of the present invention is to provide an improved valve of the foregoing type which is comparatively simple and economical in construction, yet which is efficient and relatively noise free in operation.

Another and more specific object is to provide such a valve comprising a ball element adapted to seat positively at the opening of a tubular conduit to close the latter and to be moved from its seated position to allow fluid flow through the conduit when the fluid pressure therein exceeds a predetermined value.

Another object is to provide a shiftable seat which confronts the ball element in opposition to the seat at the conduit opening. A backing having a smooth surface confronting the shiftable seat yieldingly urges the latter into seated engagement with the ball to urge the same into seated position at the conduit opening. The smooth surface of the backing freely enables transverse adjustment of the shiftable seat with respect to the backing and the conduit opening, thereby to enable transverse adjustment of the ball to a stable balanced position in the fluid flow stream while retaining the ball in seated position at the shiftable seat when the ball becomes unseated from the conduit opening.

Another object is to provide a valve of the above character wherein the backing has unitary guide portions sleeved over the conduit in sliding guided relationship to maintain the backing in fixed axial alignment with the conduit while enabling resiliently opposed axial movement of the backing.

Other objects of this invention will appear in the following description and appended claims, reference being had to the accompanying drawings forming a part of this specification wherein like reference characters designate corresponding parts in the several views.

Figure 1:
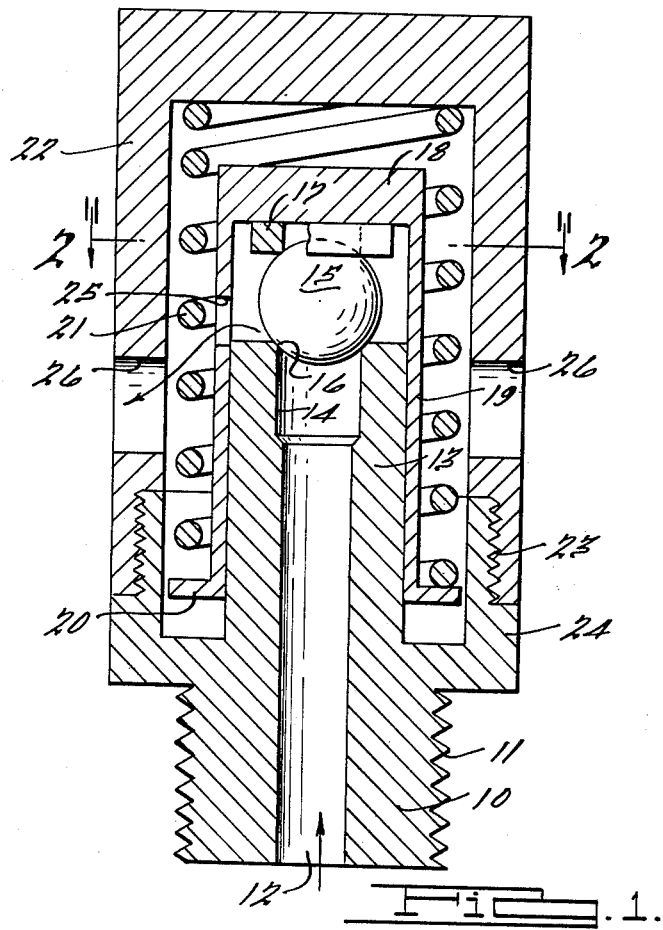
Figure 1 is substantially a longitudinal mid-sectional view through a valve assembly embodying the present invention.
Figure 2:
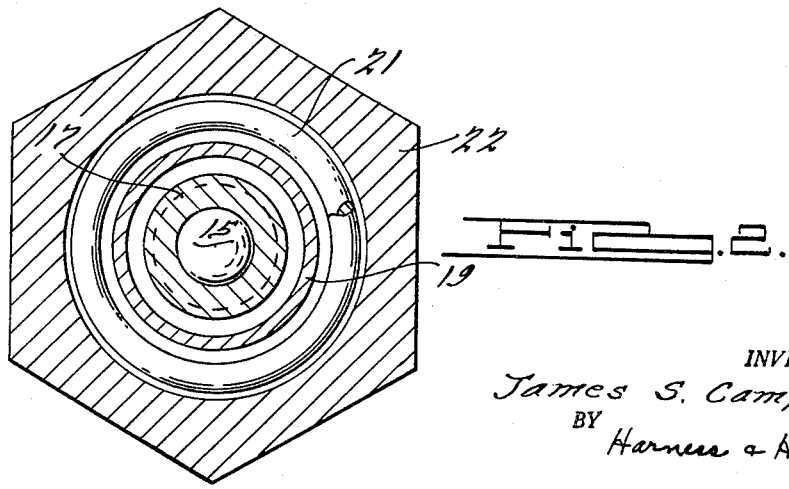
Figure 2 is a transverse sectional view taken in the direction of the arrows substantially along the line 2—2 of Figure 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A valve assembly embodying the present invention is illustrated comprising a conduit 10 having a lower threaded end 11 adapted for connection with a fluid circuit, as for example the high pressure side of a fluid pump for an automobile power steering system. In such an application high pressure fluid in a bypass circuit for the pump enters the conduit at 12, then discharges to the low pressure or inlet side of the pump in accordance with operation of the valve as described below.

The upper portion of the conduit 10 comprises a tubular stem 13 having a terminal bore enlargement 14 against which seats a ball valve element 15. Preferably the enlargement 14 is dimensioned with respect to the diameter of the ball 15 so that the surface of the latter meets the periphery of the bore enlargement 14 at approximately a 45° angle. In order to provide a suitable fixed seat for the ball 15, the upper end of the bore enlargement 14 is chamfered slightly at 16.

Diametrically opposite the seat 16 is an adjustable annular washer type seat 17 having its lower inner circumference chamfered similarly to the seat 16 to provide a seating surface for the ball 15. The adjustable seat 17 is yieldingly urged downwardly against the ball 15 by suitable means including a rigid backing 18 having tubular sides 19 slidably sleeved over the mating smooth exterior of the stem 13. The lower ends of the sides 19 terminate in an outwardly projecting annular foot flange 20 which comprises a retainer for coil spring 21 under compression against the upper portion of a housing cap 22. A cylindrical body of the latter extends downwardly in spaced relation around the spring 21 and is threadably connected at its lower end at 23 to an annular upwardly extending collar portion 24 integral with conduit 10. The inner circumference of the collar 24 is spaced from the flange 20 and spring 21 to enable their free vertical movement. Symmetrically arranged at circumferentially spaced locations in the sleeve 19 and cap 22 respectively are fluid discharge ports 25 and 26.

In operation of the structure described, spring 21 urges backing 18 downwardly and thus urges seat 17 against ball 15 and the latter against seat 16 to close the upper end of conduit 10 to the passage of fluid. When the fluid pressure within the bore of conduit 10 exceeds a value predetermined by the tension of spring 21, the ball 15 is raised from its seat 16 to enable passage of fluid through conduit 10 and out of the valve assembly via ports 25 and 26 as indicated by the arrows. In this regard, it is to be noted that the port 25 is located at or below the center of the ball 15, so that the latter is not directly in the fluid flow path. In consequence, chattering of the ball resulting from changes in momentum of the oil flow is minimized. Where the valve assembly shown is employed in a bypass circuit of a power steering pump, the fluid discharged from ports 26 is suitably returned to the pump inlet.

The confronting surfaces of the sliding seat 17 and backing 18 are flat and smooth in a plane perpendicular to the axis of the stem 13. Upon movement of ball 15 from seat 16 to enable fluid flow through the valve assembly, seat 17 is readily adjustable transversely of the aforesaid axis so as to maintain itself in seated position with respect to the ball and to accommodate itself to transverse displacement of the ball 15. In this action, the ball 15 swings or pivots laterally in one direction or another about one portion of the seat 16 and away from the diametrically opposite portion of the seat 16. The upper smooth surface of the adjustable seat 17 provides sufficient load bearing contact with the mating smooth surface of the backing 18 so as not to be embedded thereinto in consequence of the high fluid pressure acting on the ball. By virtue of the shiftable seat 17, the ball cannot become embedded into the backing 18 at a fixed location, so that chattering of the ball resulting from unbalanced fluid forces acting thereon is avoided. Instead, the seat 17 readily accommodates itself to lateral or transverse movement of the ball and enables the latter to position itself freely in the flow path in accordance with the fluid pressure forces acting on the ball. The ball thus assumes a stable balanced position in the flow path, whereby chattering and vibration of the ball is minimized and a highly efficient quietly operating valve is obtained.

Having thus described my invention, I claim:

1. In a valve, a ball, a first seat for said ball having an orifice therein, said orifice being closed by said ball when the latter is in seated position at said seat, a second seat for said ball confronting the latter in opposition to said first seat, means yieldingly urging said seats into seated position with said ball including a backing for said second seat, said backing and second seat having smooth confronting surfaces for relative sliding movement of said second seat with respect to said backing to enable adjustment of said second seat upon movement of said ball from said first seat.

2. In a valve, a ball, a first seat for said ball having an orifice therein, said orifice being closed by said ball when the latter is in seated position at said seat, a second seat for said ball confronting the latter in opposition to said first seat, means yieldingly urging said seats into seated position with said ball including a backing for said second seat, said backing and second seat having smooth confronting surfaces extending transversely of the direction of the yieldingly urged relative movement of said seats into said seated position to enable relative transverse sliding movement of said second seat with respect to said backing upon movement of said ball from said first seat.

3. In a valve, a first seat, a shiftable seat, a ball spacing said seats, said first seat having an aperture therein closed by said ball when the latter is seated thereat, means yieldingly urging said seats and ball into seated position including a backing having a smooth surface confronting said shiftable seat to enable shifting of the latter and ball seated thereat upon movement of the ball from said first seat.

4. In a valve, a first seat, a shiftable seat, a ball spacing said seats, said first seat having an aperture therein closed by said ball when the latter is seated thereat, means yieldingly urging said seats and ball into seated position including a backing having a smooth surface confronting said shiftable seat and extending transversely of the direction of the yieldingly urged relative movement of said seats into said seated position to enable relative transverse shifting of said shiftable seat and ball seated thereat upon movement of said ball from said first seat.

5. In a valve, a tubular conduit comprising a stem portion having a first annular seat defining a portion of said conduit, a shiftable seat, a ball spacing said seats, said conduit being closed by said ball when the latter is seated at said first seat, means yieldingly urging said seats and ball into seated position including a backing having a smooth surface confronting said shiftable seat to enable shifting of the latter and ball seated thereat upon movement of said ball from said first seat, said backing having guide portions extending along said tubular conduit in guided sliding relation therewith.

6. In a high pressure ball relief valve, a ball valve element, a tubular conduit having a first seat for said ball defining a portion of said conduit, a shiftable seat for said ball, said ball spacing said seats and closing said conduit when in seated position at said first seat, a backing for said shiftable seat having a smooth surface confronting the latter seat to enable shifting thereof and said ball seated thereat upon movement of said ball from its seated position at said first seat, and resilient means yieldingly urging said backing toward said ball to urge said seats into seated position with said ball.

7. In a high pressure ball relief valve, a ball valve element, a tubular conduit having an annular fixed seat for said ball defining a portion of said conduit, an annular shiftable seat for said ball, said ball spacing said seats and closing said conduit when in seated position at said fixed seat, a backing for said shiftable seat having a smooth surface confronting the latter seat to enable shifting thereof and said ball seated thereat upon movement of said ball from its seated position at said fixed seat, and resilient means yieldingly urging said backing toward said ball to urge said seats into seated position with said ball.

8. In a high pressure ball relief valve, a ball valve element, a tubular conduit comprising a stem portion having a first seat for said ball defining a portion of said conduit, a shiftable seat for said ball, said ball spacing said seats and closing said conduit when in seated position at said first seat, a backing for said shiftable seat having a smooth surface confronting the latter seat to enable shifting thereof and said ball seated thereat upon movement of said ball from its seated position at said first seat, and resilient means yieldingly urging said backing toward said ball to urge said ball and seats into seated relation, said backing having guide portions extending along said stem portion in guided sliding relation.

9. In a high pressure ball relief valve, a ball valve element, a tubular conduit comprising a stem portion having a fixed seat for said ball defining a portion of said conduit, a housing comprising a unitary structure with said conduit and enclosing said stem portion, a shiftable seat for said ball, said ball spacing said seats and closing said conduit when in seated position at said fixed seat, backing means for said shiftable seat having a smooth surface confronting the latter seat to enable shifting thereof and said ball seated thereat upon movement of said ball from its seated position at said fixed seat, and resilient means disposed under tension between portions of said housing and backing means for yieldingly urging said surface toward said ball to urge said ball and seats into seated relation, said backing means having guide portions extending along said stem portion in guided sliding relation, and said guide portions and housing having openings therein for passage of fluid when said ball is unseated from said fixed seat by fluid pressure in said stem portion.

References Cited in the file of this patent

UNITED STATES PATENTS

| | | |
|---|---|---|
| 1,504,119 | Hansen | Aug. 5, 1924 |
| 1,701,305 | Meyers | Feb. 5, 1929 |
| 2,415,258 | Parker | Feb. 4, 1947 |